United States Patent [19]
Urano et al.

[11] 3,821,768
[45] June 28, 1974

[54] VIEWFINDER SHIELD IN A SINGLE LENS REFLEX CAMERA ADOPTING A TTL LIGHT MEASURING METHOD

[75] Inventors: Fumio Urano, Wako; Naoyuki Uno; Katsuhiko Nomura, both of Kawagoe; Koichiro Watanabe, Funabashi; Tadazumi Sakazaki, Tokyo; Katsuhiko Miyata, Kawasaki, all of Japan

[73] Assignee: Asaki Kogaku Kogyo Kabushiki Kaisha, Tokyo-to, Japan

[22] Filed: Aug. 9, 1972

[21] Appl. No.: 279,184

[30] Foreign Application Priority Data
Aug. 13, 1971 Japan.................. 46-61464

[52] U.S. Cl..................... 354/219, 354/60
[51] Int. Cl. ............................. G03b 13/02
[58] Field of Search............ 95/42, 11 V, 44 R; 88/1.5 R

[56] References Cited
UNITED STATES PATENTS
3,008,397  11/1961  Winkler..................... 95/42
3,613,543  10/1971  Mita et al. ................. 95/42
3,643,573  2/1972   Hirama..................... 95/11 V Primary Examiner—Samuel S. Matthews
Assistant Examiner—E. M. Bero
Attorney, Agent, or Firm—Knobbe, Martens, Olson, Hubbard & Bear

[57] ABSTRACT

A light-blocking plate released by a shutter button is inserted in the finder light path within a single lens reflex camera including an electric shutter device of TTL light measuring type for blocking only the inverse incident light coming through the finder eyepiece. A light measurement is completed after termination of blocking movement of the light-blocking plate and during the time period of such associating movements as the swinging-up movement of the reflecting mirror and the diaphragm value adjusting operation. After completing the shutter closing operation the light-blocking plate is retracted out of the finder light path by means of a mechanical lever and spring arrangment.

12 Claims, 5 Drawing Figures

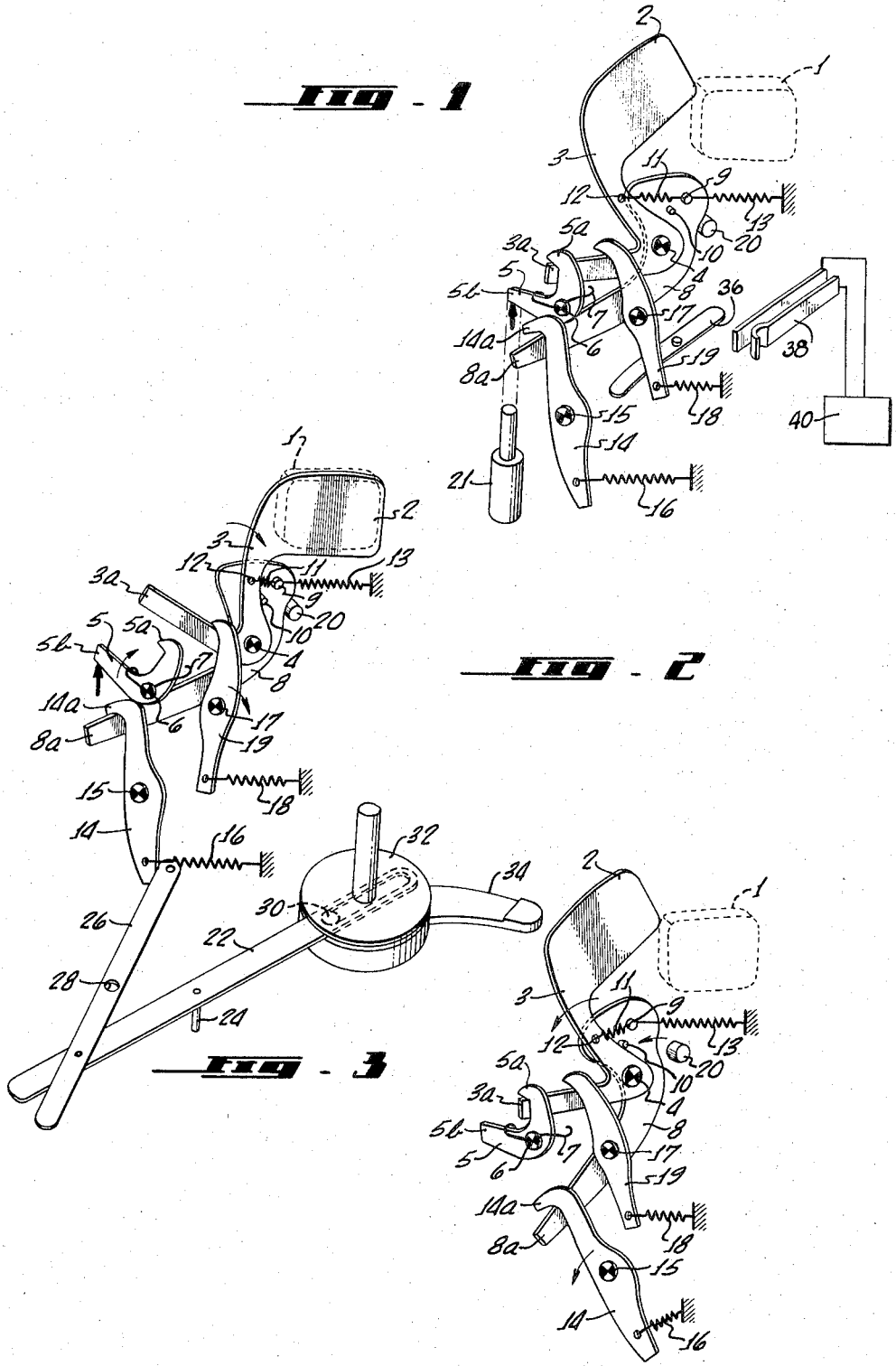

VIEWFINDER SHIELD IN A SINGLE LENS REFLEX CAMERA ADOPTING A TTL LIGHT MEASURING METHOD

The present invention relates to a single lens reflex camera adopting the so-called TTL (or through the lens) light measuring method and having light receiving elements arranged in the finder light path for sensing the field brightness or, more particularly, to an apparatus and a method for making a light measurement more accurate.

The superiority of the TTL light measuring method lies in that the actual measurement of the light from the field which has passed through the photographing lens and reaching the film surface can be made practically. With such a light measuring method, however, when light-receiving elements are disposed in the region of finder light path or, for example, at both sides of the ocular lens (which is located opposite to the light leaving surface of the penta prism) in opposed relationship to said light leaving surface, a portion of the light entering the camera in the inverse direction through the finder eyepiece falls on the light-receiving elements. This inverse incident light is sensed, together with the light directed from the object to be photographed onto the light-receiving elements in the normal direction, by the light-receiving elements. Consequently the measured value will include an additional error due to the inverse incident light.

When the camera is operated in a normal manner, the inverse incident light will not have any large influence over the measured value. However, when the finder eyepiece portion is not covered at all, as in the case of a photographing operation using a self-timer; or when the finder eyepiece portion is directed towards the bright light source, as in the case of microscopic photographing operation, the amount of the inverse incident light coming through the eyepiece portion will be such a large value that it cannot be neglected.

In accordance with this invention the method to avoid this influence is to cover the finder eyepiece portion when making a light measurement. Since the finder field is intercepted during the finder eyepiece being covered, considerations must be had to select the most effective time in the camera operation at which the finder eyepiece is to be covered or the light measurement is to be made. Consideration must be taken also to the operating means for covering the finder eyepiece as well as to the determination of the time when the finder eyepiece is to be covered.

In a preferred form of the present invention, a lever carrying a light-blocking plate is inserted in the finder light path at the position between the finder eyepiece and the light receiving elements at a time immediately before the swinging-up movement of the reflecting mirror. Upon shutter releasing operation or, for example, upon depression of the shutter button, the light-blocking plate is first inserted in the light path. Immediately after that, a light measuring operation is started and the operation for opening the shutter and raising the reflecting mirror is initiated caused by movement of a lever carrying the light-blocking plate. The light measuring operation is completed before the reflecting mirror has been swung up completely.

By having the light blocking step initiated by operation of the shutter button and automatically terminated when the picture taking is completed, the user will not have any inconvenience of having the light path blocked, and the user does not have to remember to block the light during the light measuring operation. When the reflecting mirror reaches the fully swung-up position, the shutter opening operation will be started. The time at which the shutter is to be opened is decided depending upon the previous light measurement. After the lapse of shutter opening time the shutter will normally be closed and, by the return movement of the reflecting mirror at or after completion of the shutter closure, a lever which has been biased in association with the shutter charge operation will be released from the biased position and returned to its initial position. At the very time, the light-blocking plate will be retracted from the light path by means of the lever.

The invention will be further understood by reference to the following detailed description of the preferred embodiment shown in the accompanying drawings, in which:

FIG. 1 is a perspective partially schematic view of the mechanism with the blocking plate in unblocking position and ready to be operated by the shutter button;

FIGS. 2 and 3 are perspective views of the mechanism shown in FIG. 1, each representing the manner of operation in the sequential order;

Figure 4:
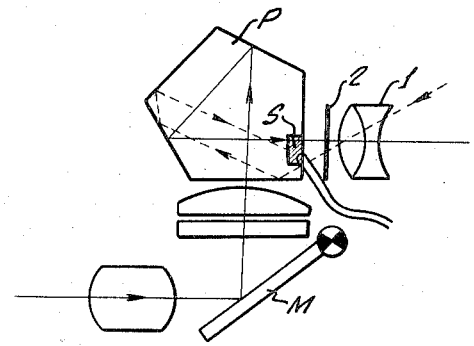
FIG. 4 is a side elevation schematic view representing the disposition of the light-blocking plate within a single lens reflex camera.

Referring first to FIGS. 1 and 4, a light-blocking plate 2 is arranged in such a manner that it can be inserted immediately before the finder eyepiece 1. In this embodiment, a pair of light-receiving elements S are provided, each at either side of the light-leaving surface of a penta prism P disposed in front of the finder eyepiece 1 in a single lens reflex camera. The light-blocking plate 2 is formed by enlarging an active end of the lever 3 which is pivotally mounted on the camera body at an axis 4. The other active end 3a of the lever 3 is engaged with an arresting lever 5 carrying a hook-shaped portion 5a so that the light-blocking plate 2 is held in such a condition that it is retracted from the position in front of the finder eyepiece 1. The arresting lever 5 is pivotally mounted on the camera body at an axis 6 and is subjected to a spring force in the direction that the hook-shaped end portion 5a is to be engaged with the active end 3a by means of a spring 7 disposed around the axis 6. The other end 5b of the lever 5 is so designed that it is pushed upwardly in the direction of the arrow by means of a shutter button 21.

Around the axis 4 is also pivoted driving force-relaying lever 8. On one end portion of the lever 8 are planted a pair of pins 9 and 10. Between the pin 9 on the lever 8 and a pin 12 secured on the blocking plate lever 3 is hooked a spring 11 which liberates the acting force in the direction for inserting the light-blocking plate 2 in the finder light path immediately in front of the finder eyepiece 1. The pin 10 serves as a stopper means for the blocking plate lever 3. On the pin 9 is also secured an end of another spring 13, the other end thereof is fixed to the camera body. The spring 13 provides force on the lever 8 in the opposite direction of the weaker force produced by the spring 11.

The other active end 8a of the lever 8 is arrested by means of a hook 14a of driving lever 14 which is pivoted at the axis 15 and rotatable in the plane which intersects the plane of rotation of the lever 8. A strong spring 16 is attached to the other end of the driving lever 14 to thereby rotate the driving lever 14 in such a direction that the hook 14a carried on the driving lever 14 engages with the active end 8a of the lever 8. The driving lever 14 is provided with a mechanism which forces it to rotate against the force of the spring 16 in synchronism with the film winding-up operation and holds the driving lever 14 at the position where the spring 16 stores therein a sufficient resilient force. For example, there is shown in FIG. 2 a lever 22 pivotally mounted at pin 24 and pivotally connected to a lever 26 which is pivoted at point 28. The other end of the lever 22 has an elongated slot mounted on a pin 30 on the periphery of a dish 32 which moves with a film winding handle 34 when the handle is moved in the winding direction shown by the adjacent arrow. In a single turn of the disk 32, the lever 22 makes a single oscillating motion, which is transmitted through the intermediate lever 26 to the lever 14 to move it from the position of FIG. 3 to the position of FIG. 1. The driving lever 14 is held in this manner by means not shown and is then released at the time when the shutter is closed. This movement is quite similar to the movement of the driving lever adapted to drive a reflecting mirror in the conventional single lens reflex camera. Accordingly, the driving lever 14 conveniently serves also as a driving lever for the reflecting mirror, although the actual connection for such is not shown in the drawing.

A shutter opening-starting lever 19, which is pivoted on an axis 17 and having a weak spring 18 acted on an end thereof, is in contact at the other end thereof with the lever 3 at about the intermediate portion between an end 3a of the lever 3 and the point at which the lever 3 is pivoted on the axis 4. The lever 19 serves to initiate the associating operations for the shutter opening.

FIG. 2 is the arrangement of FIG. 1 shown under the state that the light-blocking plate 2 is inserted in the finder path. Upon depression of the shutter button, an end 5b of the lever 5 is pushed up in the direction of arrow from the position shown in FIG. 1 so that the lever 5 is rotated against the force of spring 7 in the clockwise direction as seen in FIG. 1. This disengages the hook-shaped end 5a from the end 3a of the lever 3. As a result, the lever 3 is rotated by the force of spring 11 in the clockwise direction as seen in FIG. 1 around the axis 4 to thereby insert the light-blocking plate 2 in the light path. The inserted light-blocking plate 2 intercepts the inverse incident light coming from the finder eyepiece 1. As soon as the inverse incident light has been intercepted, a light measurement is initiated by means of the light-receiving elements.

The rotation of the lever 3 causes the lever 19 to be rotated in the direction of arrow as seen in FIG. 2 against the force of the spring 18. With the final movement of the light-blocking plate 2 for completely entering the light path, the lever 19 transmits the associating movement for opening the shutter, by engaging the shutter opening actuating member 36 shown in FIG. 1. The actuating member 36 contacts the switch 38 which initiates a typical light measuring circuit 40. One such switch and light measuring circuit is exemplified by U.S. Pat. No. 3,336,850. The movement is used for starting the swinging-up movement of the reflecting mirror M (FIG. 4), to starting pin (not shown). There is a slight delay of time between such a start instruction and the time at which the reflecting mirror M actually starts swinging-up operation. A light-measuring electrical circuit is therefore designed in such a manner that the light measurement can be completed during the time period starting at the light-blocking time including this delay of time and ending at the start of the swinging-up operation of the reflecting mirror. The resultant movement of the shutter opening actuating member 36 by the movement of the blocking plate 2 to the light blocking position initiates this associated light measuring operation.

The shutter controlling operation does not constitute any important factor and thus will be described only briefly. By a light measurement an information about the brightness of the field will be memorized temporarily, which is then applied to a circuit for effecting the electrical treatment of the information. The circuit may be constructed as a timer which converts the information quantity (voltage) into time to determine a timing value. The shutter closing operation is started at a time delayed from the shutter opening operation by the time depending on the timing value determined by said timer circuit.

Simultaneous with the shutter closure, when the driving lever 14 is released (the mechanism for this purpose is well known as a mechanism for returning the reflecting mirror back into the light path region, and hence is not shown), the driving lever 14 is rotated by the strong force acted thereon by the spring 16 in the direction of arrow as seen in FIG. 3. Upon rotation of the driving lever 14, the hook 14a of the lever 14 pushes the lever 8 at its end 8a and forces the driving force-relaying lever 8 to be rotated about the axis 4 in the counter-clockwise direction as seen in FIG. 3. The rotating lever 8 acts on the lever 3 through the pin 10 to thereby rotate the latter in the direction of arrow as seen in FIG. 3. The rotation of lever 3 in turn causes the light-blocking plate 2 to be retracted out of the light path. Towards the end of the rotational movement of lever 3, one end 3a thereof enters the region where it is arrested by the lever 5.

If the shutter button has already been pushed up to the normal state by this time, the lever 5 would have been in the original state due to the force of the spring 7. The end 3a will therefore slide along the rear edge of the hook-shaped end 5a while pushing the latter away and enter said region, where it is arrested by the lever 5. On the other hand, if the shutter button is under a depressed condition, the lever will be in the position shown in FIG. 2. One end 3a of the lever 3 will be stopped when it has entered said region and will be arrested by the hook-shaped end 5a (see FIG. 3) after the shutter button has been restored to the normal pushed-up position.

When the film is wound up for the preparation of the next photographing operation by the wind-up handle 34, the driving lever 14 is rotated about the axis 15 to the opposite direction to the arrow shown in FIG. 3. Thus the spring 16 is elongated sufficiently which results in the increase in the force stored therein. At the same time, the hook 14a is disengaged from an end 8a of lever 8. Consequently, the lever 8 is restored by the spring 13 rotating about the axis 4 in the opposite direction to the arrow as seen in FIG. 3 until the side edge of the lever 8 hits on the fixed pin 20. At this moment the weak spring 11 is elongated and the whole mechanism is restored to the original state as shown in FIG.

1. Then the same operation is repeated by operating the shutter button.

Figure 5:
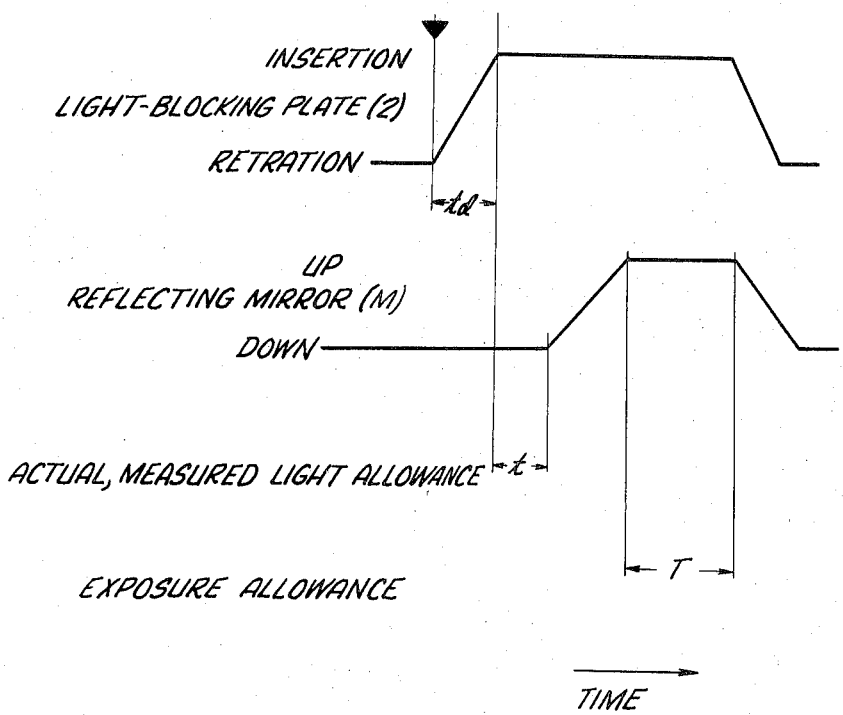
FIG. 5 is a time chart for explaining the operation of the mechanism.

FIG. 5 is a time chart representing the manner of operation of the inventive apparatus. In this chart, td represents a time period starting at the shutter operation and ending at the time when the light-blocking plate 2 intercepts the finder light path; t, a time period to be used for a light measurement; and T, an exposure time which is determined depending upon the timing value. The operation of the apparatus according to the previous embodiment will be understood more sufficiently by referring to this time chart.

For best results, attention must be paid on the following points in designing the apparatus according to the invention. It is desired that the object to be photographed can be viewed continuously through the finder until the time practically closest to the shutter opening time. Therefore, it is preferable that the operation time $td + t$ should be made as short as possible. It may be advantageous that the light-blocking plate should be made to perform an entering movement as rapid as possible and that such light-receiving elements as, for example, Si light-receiving elements should be employed. Although the light-blocking plate may be retracted out of the light path region at any time after completion of a light measurement, it is preferred that such a retracting operation is to be made at a time near the restoring movement of the reflecting mirror for enabling a film exposure under a condition free from any vibration caused by the retracting movement of the light-blocking plate and for assuring to avoid the influence on the film exposure by the inverse incident light by intercepting it during a film exposure time.

What is claimed is:

1. A single lens reflex camera comprising:
   a photographing lens;
   a view finder eyepiece;
   means defining a view finder light path extending from the photographing lens to the finder eyepiece;
   light measuring means in the light path for controlling the film exposure time;
   means movably mounted within said camera for preventing inverse incident light through the eyepiece while a light measurement is being made by the light measuring means; and
   means responsive to movement of the preventing means into a light blocking position for initiating the light measuring step.

2. The camera of claim 1 including a shutter button connected to initiate movement of said preventing means into said blocking position.

3. The camera of claim 1 wherein said preventing means includes a blocking plate movable into said light blocking position in the finder light path between the finder eyepiece and the light sensing means; and said camera including a shutter button, said blocking plate being movable into said light blocking position upon actuation of the shutter button.

4. The camera of claim 3 including means for retracting the light blocking plate upon completion of a shutter opening operation.

5. The camera of claim 4 including a pivotally mounted blocking plate lever said light blocking plate being mounted on one end of blocking plate lever, and said means for retracting the light blocking plate into unblocking position includes a pivotally mounted spring loaded driving lever and a driving force-relaying lever positioned to be pivoted by said driving lever, said driving force-relaying lever including means engaging said blocking plate lever for pivoting the blocking plate lever into unblocking position.

6. The camera of claim 5 wherein said driving means comprises a spring interconnecting the blocking plate lever and the driving force-relaying lever for urging the light blocking plate into light blocking position.

7. The camera of claim 1 wherein said light measuring initiating means comprises a pivotally mounted shutter opening-actuating member, operating in response to the movement of said preventing means into said finder light path in a position to block said inverse incident light.

8. A single lens reflex camera comprising:
   a photographing lens;
   a view finder eyepiece;
   means within said camera defining a view finder light path extending from the photographing lens to the view finder eyepiece;
   light measuring means in said light path;
   a blocking plate lever movably mounted within said camera;
   a blocking plate attached to the said blocking plate lever for movement to a light blocking position between said eyepiece and said light measuring means;
   a spring loaded driving lever pivotally mounted adjacent said blocking plate lever;
   a driving force-relaying lever positioned to be pivoted by said driving lever;
   means operated by a film advance mechanism for pivoting said driving lever in a manner to ready it for the next picture taking operation and to release said force-relaying lever;
   spring means for pivoting said force-relaying lever into a position where it will permit movement of the blocking plate lever;
   an arresting lever for holding the blocking plate lever in the unblocking position; and
   a spring interconnecting the light blocking plate lever and the driving force-relaying lever for urging the light blocking plate lever into light blocking position, said latter spring being tensioned by movement of the force-relaying lever caused by said spring means when the force-relaying lever is released from the driving lever.

9. In a single lens reflex camera, a finder light path including a pivotally mounted reflecting mirror receiving light from the photographing lens, a viewing prism receiving light from the mirror, and a finder eyepiece for viewing the prism, and means in the light path adjacent the prism for sensing the available light to control the film exposure operation, the improvement comprising:
   a blocking plate lever pivotally mounted on the camera;
   a light blocking plate mounted on the end of the pivoted blocking plate lever and movable into position between the eyepiece and the prism to prevent inverse incident light from coming through the eyepiece to the light receiving means;
   an arresting lever movable by a manually operable shutter button and engaging the other end of the blocking plate lever to hold the plate in an unblocking position;

a shutter-opening starting lever to be actuated by the blocking movement of the blocking plate lever for initiating the light measuring operation and the eventual opening of the shutter;

a driving lever released at the completion of the automatically timed shutter operation for pivoting the reflecting mirror downwardly into viewing position;

a driving force-relaying lever positioned to be moved by said driving lever as it pivots the mirror downwardly, and connected to move said blocking plate lever into light unblocking position where it is held by said arresting lever;

means operated by a film advancement mechanism for cocking said driving lever and releasing said force-relaying lever; and means for moving said force-relaying lever and for readying said blocking plate lever for movement when it is released by actuation of the shutter button.

10. The camera of claim 8 wherein the means for moving said force-relaying lever includes a spring connected between the force-relaying lever and a fixed point on the camera and a weaker spring interconnecting the force-relaying lever and the light blocking plate lever, said weaker spring being tensioned by the movement of the force-relaying lever caused by the first mentioned spring.

11. The camera of claim 9 including means mounted on said force-relaying lever for engaging the blocking plate lever so as to move the blocking plate lever into unblocking position when the force-relaying lever is moved by said driving lever as it pivots the mirror downwardly.

12. In a single lens reflex camera having a photographing lens, a view finder eyepiece, a swingably mounted reflexing mirror having a lower position for reflecting light from the lens to the eyepiece and an upper position out of the path of the light from the lens, light sensing means for sensing the light entering the camera through the lens and directed towards the eyepiece, a light blocking plate movable into and out of the path between the eyepiece and the light sensing means to block th light entering the camera through the eyepiece, and a shutter button for initiating operation of the camera, the improvement comprising:

means interconnecting said shutter button and said light blocking plate causing said plate to be moved to its light blocking orientation upon actuation of the shutter button; and means responsive to the blocking movement of said light blocking plate for initiating a light sensing measurement after the plate has moved to said blocking orientation and for initiating movement of said mirror to said upper position, the mirror moving operation inherently having a slight delay during which time said light sensing measurement is completed.

* * * * *

UNITED STATES PATENT OFFICE
CERTIFICATE OF CORRECTION

Patent No. 3,821,768        Dated June 28, 1974

Inventor(s) Fumio Urano, Naoyuki Uno, Katsuhiko Nomura, Koichiro Watanabe, Tadazumi Sakazaki, and Katsuhiko Miyata It is certified that error appears in the above-identified patent and that said Letters Patent are hereby corrected as shown below:

Column 7, line 21, claim "8" should be claim --9--
Column 7, line 29, claim "9" should be claim --10--
Column 8, line 14, "th" should be --the--.

On the title page of the patent under "Assignee:, "Asaki" should read -- Asahi --.

Signed and sealed this 15th day of October 1974.

(SEAL)
Attest:

McCOY M. GIBSON JR.        C. MARSHALL DANN
Attesting Officer          Commissioner of Patents